United States Patent [19]
Beardsley et al.

[11] Patent Number: 5,157,770
[45] Date of Patent: Oct. 20, 1992

[54] NONSYNCHRONOUS DASD CONTROL

[75] Inventors: Brent C. Beardsley; Michael T. Benhase, both of Tucson, Ariz.

[73] Assignee: International Business Machines Corporation, Armonk, N.Y.

[21] Appl. No.: 575,741

[22] Filed: Aug. 31, 1990

[51] Int. Cl.⁵ ............................................. G06F 13/12
[52] U.S. Cl. .................... 395/275; 364/DIG. 1; 364/238.3; 364/239.7; 364/248.1; 364/260.1
[58] Field of Search ..................... 395/275; 360/69, 75, 360/78.01

[56] References Cited

U.S. PATENT DOCUMENTS

| | | | |
|---|---|---|---|
| 4,262,332 | 4/1981 | Bass et al. | 364/200 |
| 4,310,882 | 1/1982 | Hunter et al. | 364/200 |
| 4,882,671 | 11/1989 | Graham et al. | 395/275 |

Primary Examiner—Michael R. Fleming
Assistant Examiner—Debra A. Chun
Attorney, Agent, or Firm—Greenlee & Winner

[57] ABSTRACT

Apparatus for controlling DASD in a manner that is not synchronous with channel operation, that is, transfer of commands and data are not limited to inter-record gap periods. A device interface processor controls which recording track is accessed by the DASD with data being transferred to and from a buffer. A device track indicator designates which recording tracks the device will move to in sequence. A channel interface processor controls the movement of data from and to the buffer and channel. A channel track indicator designates the recording track sequence in which the channel interface processor will access the data to be transferred. A method of operation is disclosed for utilizing the two indicators to enable the device and channel processors to communicate with each other in case the device reads incorrect records in a multi-track read operation.

6 Claims, 2 Drawing Sheets

| STARTING CYLINDER | STARTING TRACK | SEQUENTIAL ORDER OF TRACKS TO BE USED | |
|---|---|---|---|
| 1B | 0000 | 1010001000100000...0 | 30 |
| 1B | 0001 | 1100010001000000...0 | 31 |
| 1B | 0001 | 1100010001000100...0 | 32 |

FIG. 2.

NONSYNCHRONOUS DASD CONTROL

This invention relates to data processing systems and more particularly to control of DASD peripheral data processing systems operating in a nonsynchronous manner.

BACKGROUND OF THE INVENTION

Data processing systems frequently include large scale storage devices such as direct access storage devices (DASD) located externally to the host computer and sometimes at significant distances therefrom. Communication from the host computer to the DASD is accomplished over signal cables called channels extending between the DASD and its control unit and connecting them to the host processor.

Current technology provides DASD units with several separate disks, all rotating on the same spindle. These disks or platters are accessed by head disk assemblies with a transducing head providing access to one surface of each disk. There may be, for example, nine platters in a disk drive providing 16 usable surfaces with one of the usable surfaces used for maintaining accurate tracking capability. In such units there are 15 usable surfaces for data and when all the heads are positioned, a cylinder of 15 physical, recording tracks can be accessed.

DASD units frequently use a count key data architecture (CKD) where records written on the track are provided with a count field (an ID), a key length field and a data field. In writing these fields along a recording track, a gap is provided between each of the fields. Those gaps are then utilized to provide a time period in which the DASD control unit and the host channel can communicate with each other. It is during the gap time that the control unit provides information back to the channel in response to the command that it has received and gets the next command in order to begin the next operation for searching, retrieving or writing records. This process is termed gap synchronous, that is to say, that the particular record on which the DASD device is working, is the same record on which the channel has requested work, so that both the channel and the device are synchronous with each other in the sense that they are both working on the same record, either to read it or to write it.

As systems become faster and faster, the delays created by the gaps or by the performance of functions within a gap period have to be shrunk to such an extent that the functions can no longer be adequately performed. This is particularly true of optical fiber channels where the data burst rate is several times the burst rate for copper channels.

Nonsynchronous storage subsystems are developed to enable the channel and the device to transfer data independently of each other. To do that, a buffer is inserted into the data path between the device and the channel with separate data paths for the channel and the device, each under the control of separate processors. In that manner, the device processor can access records in one portion of the buffer while another portion of the buffer is being used by the channel processor. Channel programs can be executed such that the channel and storage control activities required to end execution of one command and advance to the next do not have to occur during the inter-record gap between two adjacent fields.

In a synchronous system, the device and the channel operate on the same record so that the data transferred to the buffer by the device is the same data that the channel wants. In a nonsynchronous system, however, the device may operate significantly ahead of the channel during read operations and in order to secure satisfactory performance, it is desirable to have a mechanism for predicting what records the channel will want so that when an end of track is reached, the device switches to read the next track probably desired by the channel. Similarly, when performing write operations the channel is frequently ahead of the device and some mechanism is needed for informing the channel processor what tracks have probably been written without tying up the channel for the entire time that the device is writing the records.

An object of this invention is to improve performance by providing a mechanism for enabling the device to switch recording tracks in the proper sequence. This is especially important where a series of nonconsecutive tracks is to be read.

Another object is to enable the lagging activity to inform the leading activity of changes needed to conform the leading activity to the command.

Still another object is to efficiently sense end of cylinder or end of extent to switch cylinders or to signal error.

SUMMARY OF THE INVENTION

To operate nonsynchronously an extended CKD architecture (ECKD) has been developed to permit channel programs to describe the nature and scope of a data transfer before the first data transfer command is executed. In that manner, the storage subsystem is informed of the type of data transfer to be performed, the number of records to be operated upon and the track sector and record ID to which the device must be positioned prior to initiating data transfer. Significantly, for the instant invention, this architecture provides the sequence in which logical tracks are to be accessed, although logical tracks are independent of the geometry of any particular DASD and therefore do not necessarily describe the sequence in which the physical recording tracks are to be accessed. This invention makes use of logical track sequence in order to build a bit map which will indicate the sequence in which the channel should access data associated with physical recording tracks and a second bit map which will indicate the sequence of accessing recording tracks by the device.

The foregoing and other objects, features and advantages of the invention will be apparent from the following more particular description of a preferred embodiment of the invention, as illustrated in the accompanying drawing.

BRIEF DESCRIPTION OF THE DRAWING

The above-mentioned and other features and objects of this invention and the manner of attaining them will become more apparent and the invention itself will best be understood by reference to the following description of embodiments of the invention taken in conjunction with the accompanying drawing, the description of which follows.

FIG. 2 shows control information contained in the initializing buffer of FIG. 1.

DETAILED DESCRIPTION

Figure 1:
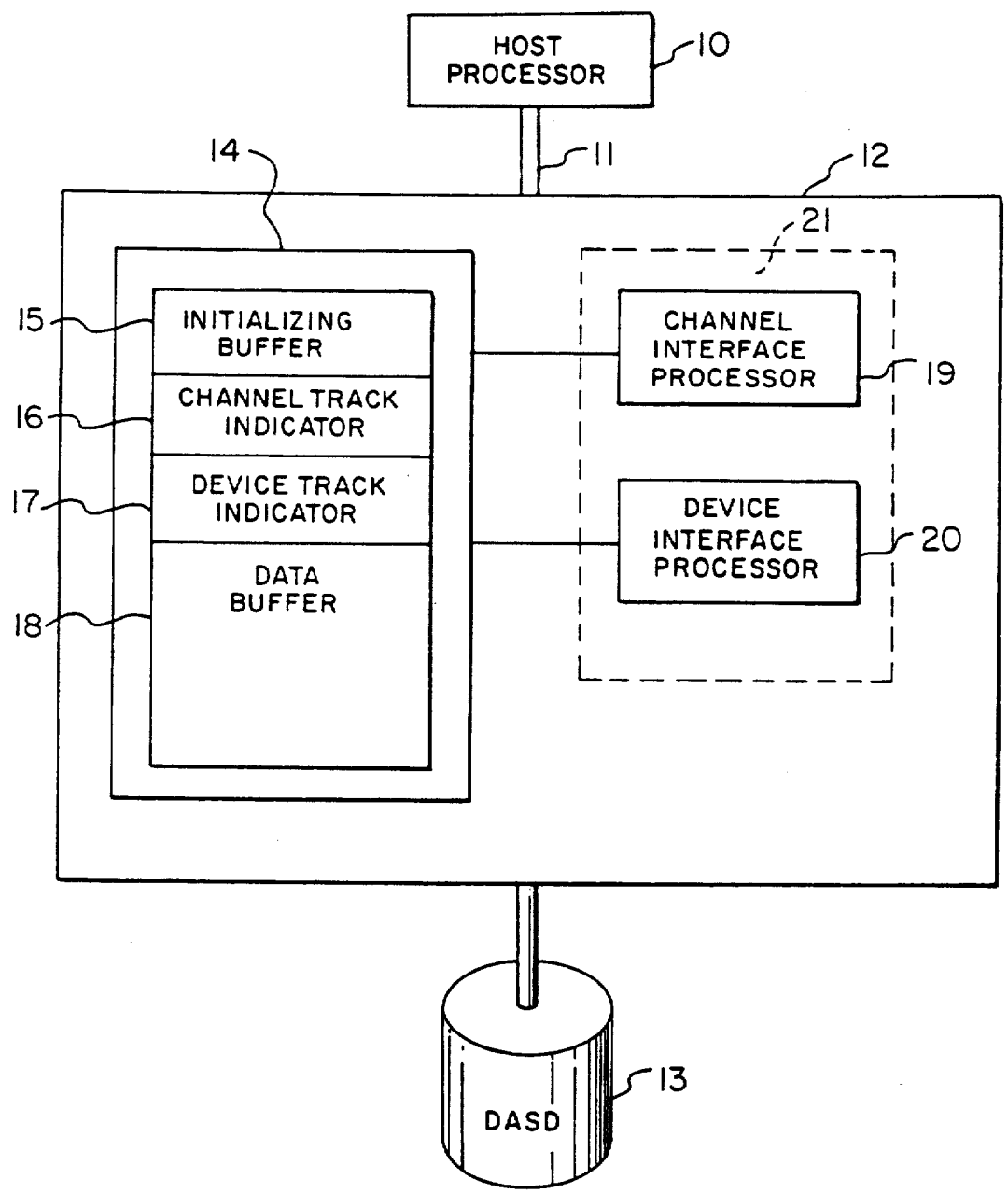
FIG. 1 shows a simplified block diagram of a data processing system using the instant invention.

Nonsynchronous operation does not define how far apart in time the channel and device operations must be and does not limit how far apart they can be. During read operations, the device control can read a few bytes; a field, a record or even several records into the buffer before the first read command is executed. In write operations the channel control can receive one or more write commands and transfer the associated data into a buffer before the first field is written to the device.

ECKD uses the same track addressing scheme as the well known CKD scheme. The track is the smallest directly addressable space on a device and each track has an arbitrary starting point called an index. However, ECKD specifically defines tracks in such a way that an ECKD track may not correspond to a full device rotation. Moreover, the ECKD defines a cylinder to be an arbitrary grouping of tracks, that is there may be no geometric relationship between tracks in the same cylinder. Consequently, these may be termed logical tracks in logical cylinders bearing no geometrical relationship to any particular DASD. In that manner, the channel program can operate on several DASD without need for change. The channel control unit is responsible for identifying physical tracks corresponding to the logical tracks.

Track format is the same in ECKD as it is in CKD. The first area on the track is the home address which identifies the track and is followed by a special record called record zero containing the address of the track. Record zero is then followed by a data area containing user records.

Before data transfer can begin, the device control must be oriented to the correct track as designated by the channel program. It does that by detecting either the index point or the start of a count area other than record zero. Once the count area or index has been detected, the device control can work its way down the track to perform the operations commanded by the channel. In order to operate efficiently, ECKD channel programs provide a locate record extended command that specifies the type and scope of the data transfer operation. Locate record extended command parameters identify the sequence in which logical tracks are to be accessed by the device. In that manner, the read or write operations to be performed by subsequent data transfer commands are completely defined in the sense that the domain of the data transfer has been stated. The channel program also provides a define extent instruction which identifies the track for the beginning of the extent and a track for the end of the extent. Obviously, the domain of data transfer defined by locate record extended must be within the extent.

After validating the locate record extended parameters, the control unit directs the device to seek a first specified track, positions the device to the designated sector and begins a search operation to further position itself to the particular record area on the track required by the first R/W channel command word (CCW).

FIG. 1 shows a simplified block diagram of a data processing system including the instant invention. Host processor 10 is connected by a channel 11 to a control unit 12. Control unit 12 and DASD 13 comprise a peripheral data processing subsystem for managing storage activities on the DASD. FIG. 1 is simplified. Actually there may be several channels 11 connected to the control unit 12. At the current time one common configuration has 16 channels connected to a control unit. As a result, there can be up to 16 host processors connected into the one control unit, although redundancy requirements generally limit the number of host processors. In the same configuration, the control unit can be connected to 64 DASD. However, for purposes of the instant invention, it makes little difference how many channels or how many DASD are connected to the control unit and therefore the simplified scheme as shown in FIG. 1 is sufficient for explaining the environment of this invention.

Control unit 12 contains all of those electronic circuits, microprocessors and microcode needed to manage the data transfer between the channels and the DASD. Such devices are well known and only a portion of the circuits within the control unit 12 are illustrated in FIG. 1. FIG. 1 shows a control storage 14 which contains an initializing buffer 15, a channel track indicator 16, a device track indicator 17 and a data buffer 18. Control storage 14 and the various buffers and indicators in control storage 14 are connected to and controlled by a channel interface processor (CHIP) 19 and a device interface processor (DIP) 20. Both CHIP 19 and DIP 20 have access to the data buffer 18 and may also have access to other storage areas such as cache storage not shown in FIG. 1. It should be noted that CHIP 19 and DIP 20 can be separate processors or they can be implemented as separate processes operating on the same processor 21. Implementation as separate processor or a separate microcode module on the same processor is a matter of choice dictated primarily by speed and cost considerations. The terms "device interface processor" and "device interface process" are synonymous as used herein as are the terms for channel interface process and channel interface processor.

FIG. 2 is a depiction of initializing buffer 15. FIG. 2 shows the initializing buffer that is built according to information that comes down from the channel through use of the locate record extended instruction an includes a bit map of the logical tracks that are desired to be read in the dump together with an identification of the starting cylinder and starting track. However, ECKD architecture is not dependent on the geometry of the device and therefore the bit map in the initializing buffer does not relate to the physical heads and tracks on DASD units. Therefore, a translation of the information shown in FIG. 2 is made to build bit maps to show the sequence in which physical tracks are to be accessed.

FIG. 3 is a depiction of a channel track indicator 16 for a DASD with fifteen data tracks on each cylinder. Indicator 16 shows certain bits which are on and certain bits which are off. Indicator 16 contains 15 bits; one for each head on a physical cylinder located on DASD 13. Those tracks for which a bit is set on are those tracks from or to which the channel processor will access data during an operation.

FIG. 4 is a depiction of device track indicator 17 and contains 15 bits for each of the heads located on a physical cylinder in DASD 13. Those bits that are on represent those tracks that will be accessed by the device processor during an operation.

Figure 3A:
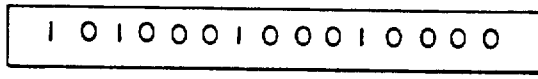
FIGS. 3A-3D shows the channel track indicator of FIG. 1.
Figure 4A:
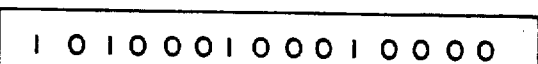
FIGS. 4A and 4B, shows the device track indicator of FIG. 1.

FIG. 2, field 30, illustrates a particular bit map of tracks to be used where the starting track is track 0. In this case, the starting track is aligned to a cylinder boundary and therefore the first bit in the bit map shown in field 20 is set on. In reading the bit map of field 30, it shows that the desired logical tracks are tracks 0, 2, 6 and 10. The bit maps for indicators 16 and 17 illustrated in FIGS. 3A and 4A show the physical tracks to be used starting with the first track to be accessed, track 0. Thereafter, FIGS. 3A and 4A show that non-sequential tracks 0,2,6, and 10 are to be accessed.

Figure 3B:
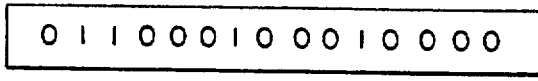

FIG. 2, field 31 illustrates a second bit map of tracks to be used where the starting track is track 1; a case where the starting track is not aligned to a cylinder boundary. In reading the bit map of field 31, it shows that the desired logical tracks are tracks 1, 2, 6, and 10. Note that the first bit of field 31 is on just as the first bit of field 30 was on. The starting track information designates what track the first bit represents. The bit map of indicator 16 shown in FIG. 3B shows the physical tracks to be used for this case showing that the first track to be accessed on the physical cylinder is track 1. Thereafter, FIG. 3B shows that non-sequential physical tracks 2, 6 and 10 are to be accessed. Note that bit map 16 always represents the physical cylinder and therefore, in this case, the first bit is zero. The initial configuration of bits in indicator 17 will be the same as for indicator 16 in FIG. 3B and therefore is not separately illustrated.

Figure 3C:
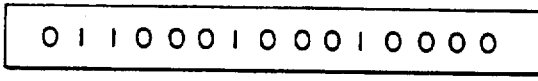

FIG. 2, field 32, illustrates a third bit map of tracks to be used, again for the case where the starting track is track 1. In reading the bit map of field 32, it shows that the desired logical tracks are tracks 1, 2, 6, 10, and also track 16 (first track of the next cylinder). The bit map of indicator 16 shown in FIG. 3C shows the physical tracks to be used for this case showing that the first track to be accessed on the physical cylinder is track 1. Thereafter, FIG. 3C shows that non-sequential physical tracks 2, 6, and 10 are to be accessed. Note that track 0 of the next physical cylinder (cylinder 1C) is not indicated in FIG. 3C. A new bit map must be generated when a cylinder switch occurs. The initial configuration of bits in indicator 17 will be the same as for indicator 16 shown in FIG. 3C and therefore is not separately illustrated.

Figure 3D:
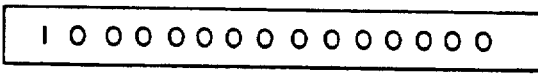

Note that field 32 of FIG. 2 calls for switching cylinders to complete the operation. At the time of switching, a new bit map is generated for indicators 16 and 17 to provide for identifying those physical tracks to be accessed on the new cylinder. FIG. 3D shows that indicator 16 calls for accessing track 0, and no others. The new bit map for indicator 17 is the same as for indicator 16 and therefore is not separately illustrated.

Figure 4B:
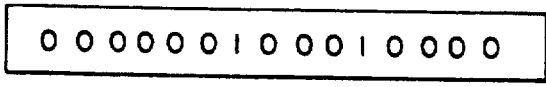

Through use of the bit maps shown in FIGS. 3 and 4, the channel interface processor 19 and device interface processor 20 can communicate with each other so that they can manage the transfer of data in an efficient fashion. For the normal read operation, such communication is no particular problem since the device simply assumes that the channel wants everything on the track and so it reads all records in succession into the buffer. Later, the channel processor comes along and pulls what it wants out of the buffer. However, in making a dump it is not efficient for the device to simply start at a first track and read all consecutive tracks. Some of those tracks may not contain data or may contain data that is not necessary to dump. Consequently it is more efficient to read only those tracks that contain desired data. This is accomplished by constructing the bit maps shown in FIGS. 3 and 4 to enable the device to read the desired tracks from DASD 13 into the data buffer 18. Through use of the bit maps, the processor 21 can operate as fast as information can be retrieved from DASD 13 and placed into the data buffer 18 without consideration of where the channel 11 is in receiving that data and passing it back to the host 10. According to conventions utilizing this invention, the device interface processor 20 will turn a bit off in the bit map shown in FIG. 4 each time the DASD switches to a new track and begins its operations there. The bit turned off is that bit representing the new track on which operations are about to commence. FIG. 4A shows the device indicator 17 as it is initially configured. FIG. 4B shows indicator 17 after the device has completed reading track 0 and while it is accessing track 2. Therefore, in FIG. 4B, the device interface processor is currently accessing data on track 2 of DASD 13, since the bit representing track 2 has been turned off while the next most significant bit on represents track 6. The bit map shown in FIG. 4B shows the bit for track 0 is off thereby indicating that the data on track 0 has been transferred to data buffer 18; it shows that the data on track 2 is currently being accessed; and that the device will switch to track 6 next and to track 10 after that.

The channel interface processor 19 controls the channel track indicator 16 in a different manner. The channel interface processor does not turn off a bit representing the track to which it has access until it is finished with that track and has switched to the next track. Therefore, the bit map shown in FIG. 3A indicates that the channel is accessing data from track 0 and has not yet finished transferring that data back over the channel. Once completed, the next track from which it will access data is track 2 followed by track 6 and then track 10. When CHIP 19 finishes with track 0, that bit will be reset and CHIP will proceed with track 2.

While the physical bit maps shown in FIGS. 3 and 4 are accurate, there is the possibility that errors will occur when the data for the initializing buffer is not provided by the channel program through use of the locate record extended instruction. This might occur for an older channel program using the CKD instruction set as opposed to the ECKD instruction set. In such case, data resident in indicators 16 and 17 are generated in control unit 12 and may not represent the tracks that later received CCW's designate. In such case, the device interface processor will not read the right records into the data buffer 18. Therefore, as the channel interface processor 19 reads the data, it checks to determine that it has access to the correct records. When channel interface processor 19 determines that the wrong data has been retrieved, it then inspects the device track indicator 17 to see what track the device processor 20 is on. Channel interface processor 19 then overwrites the device track indicator bit map thereby turning on those bits which represent the correct tracks for the device to access. When such a situation occurs, the device processor 20 is informed that more significant bits have come on and will switch heads at index to return to the proper track. In that manner, the channel and the device are enabled to communicate with each other to provide for efficient operation in the nonsynchronous mode.

The bit maps are also utilized to detect the end of a physical cylinder, end of extent or the end of an alternate track which has been selected for use when the designated track is defective. If end of extent is reached, an error is signalled. In read operations, these conditions are sensed by the channel interface processor 19 when it detects that indicator 16 has gone to zero. In the case of sensing end of cylinder, since more may remain to be read in order to satisfy the channel commands, this will result in loading channel track indicator 16 and device track indicator 17 with the bit map for the next physical cylinder needed to complete the entirety of the read domain. When the end of an alternate track is reached, the indicators 16 and 17 will be zero. At this time, the two indicators are reset to show the remaining tracks or the designated cylinder still to be accessed. The device arm will be repositioned.

For write operations, the process is similar except that the device interface processor 20 is the trailing process and therfore sensing the end of the physical cylinder is a function of device processor 20. Therefore, when indicator 17 goes to zero, at the next following index the device interface processor 20 will signal end of cylinder causing the indicators 16 and 17 to be loaded with the bit map for the next physical cylinder.

While the device indicator 17 informs the device processor 20 as to the next track, there are three conditions under which a switch should not be made. For these conditions, a "no head switch" signal is set. One of these conditions occurs when the channel interface processor 19 and the device interface processor 20 are working on the same record, i.e., in synchronism. Performance considerations dictate no switch unless channel processor 19 desires a switch.

A second condition prohibiting switches occurs when the device processor 20 is searching for the record required by the first CCW. If the desired record is record 3 and the device happens to be on record 4, it must rotate all the way around to reach record 3. While the device is searching, switching tracks is prohibited.

A third condition relates to roll mode, that is, when the command is to read or write beginning immediately and to roll through all succeeding records. The reading or writing operation begins at once and no switches are permitted until the track has been completed.

Various functions previously performed by control units in other ways, now can advantageously use indicators 16 and 17. For example, the define extent instruction may define tracks 5 through 8 as the extent. Bits representing these tracks may then be set in indicator 16 and 17 so that no other tracks are used for the operation.

While the invention has been shown and described with reference to a preferred embodiment, it will be understood by those skilled in the art that various changes in form and details may be made therein without departing from the spirit and scope of the invention.

What is claimed is:

1. In a machine effected method of operating a DASD peripheral data storage subsystem, said subsystem containing a device interface processor, a DASD, a channel interface processor and a control storage, wherein said device interface processor may operate on different DASD recording track records from said channel interface processor, a channel connecting said subsystem to a host processor, including the machine executed steps of:

receiving signals in said subsystem from said host processor over said channel, said signals defining a sequence in which logical tracks on a DASD are to be accessed, said logical tracks being geometrically independent of physical recording tracks on said DASD;

building a first recording track indicating bit map in accordance with said sequence of logical tracks, said first bit map for showing the sequence in which physical tracks on said DASD are to be operated upon by said device interface processor; and building a second recording track indicating bit map in accordance with said sequence of logical tracks, said second bit map for showing the sequence in which data records on physical tracks are to be operated upon by said channel interface processor;

whereby the device and channel processors are enabled to monitor and change data on the recording tracks in an independent fashion in order to provide efficient communication between the channel and the device in a non-synchronous manner.

2. The method of claim 1 further including the machine executed steps of:

when said channel interface processor senses an end of track condition, resetting the bit in said second bit map which represents that track; and switching said channel interface processor to the next track in the sequence indicated by said second bit map.

3. The method of claim 1 further including the machine executed steps of:

when said device interface processor senses an end of track condition, switching said device to the next track in the sequence indicated by said first bit map; and resetting the bit in said first bit map that represents the said next track.

4. The method of claim 3 further including the machine executed steps of overlaying said first bit map with said second bit map when said device interface processor is operating on a track not desired by said channel, and changing the sequence of tracks to be operated upon by said device interface processor to correspond to said first bit map now overlayed with said second bit map.

5. The method of claim 4 wherein said step of changing the sequence of tracks to be operated upon further includes the step of:

accessing tracks in the order of most significant bits in said first bit map so that if a more significant bit is turned on when said first bit map is overlayed, said device interface processor is alerted to change the sequence of tracks.

6. In apparatus for a peripheral data processing system including, in combination:

a DASD with a plurality of recording tracks;

a device interface processor connected to control access to said recording tracks;

control storage connected to said device interface processor including initializing means for containing a sequence in which logical tracks are to be accessed during an operation, said logical tracks being geometrically independent of said recording tracks;

first indicating means, contained within said control storage, for holding a recording track sequence according to which said device interface processor will access a succession of possibly non-contiguous recording tracks in order to access records included in said logical tracks;

a channel interface processor connected to said control storage to control the transfer of data to and from a channel; and second indicating means, contained within said control storage, for holding a recording track sequence according to which said channel interface processor will access records to be transferred from or to each of a succession of possibly non-contiguous tracks in order to access records included in said logical tracks.

* * * * *